INVENTOR.
EUGENE G. SPENCER
ATTORNEY.

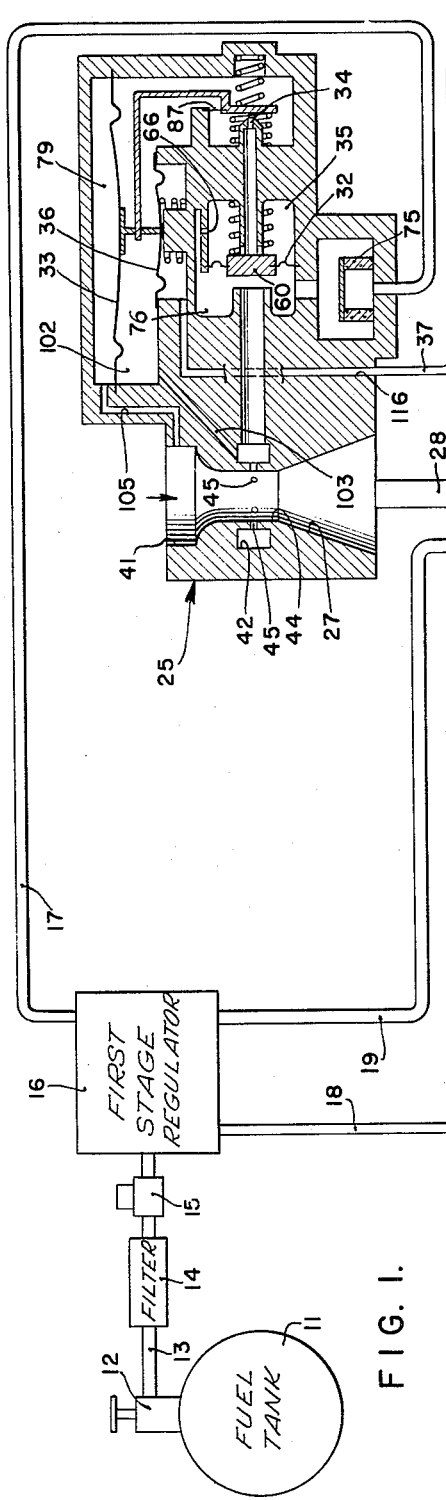
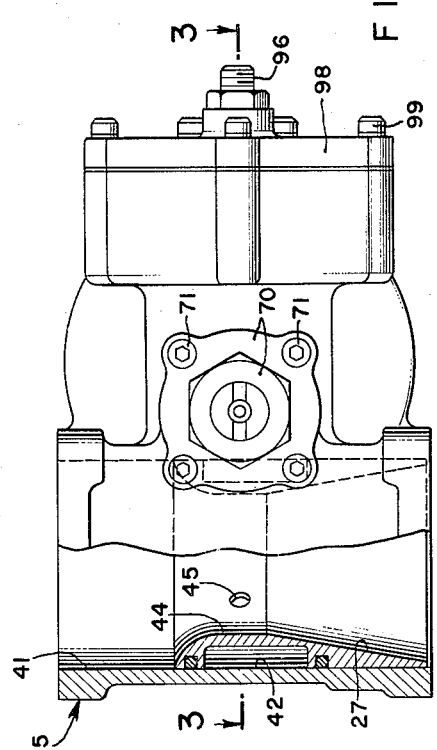
FIG. 1.
FIG. 2.
INVENTOR.
EUGENE G. SPENCER

Nov. 2, 1965  E. G. SPENCER  3,215,132
LIQUEFIED PETROLEUM FUEL SYSTEM FOR
INTERNAL COMBUSTION ENGINES
Filed March 28, 1960  3 Sheets-Sheet 3
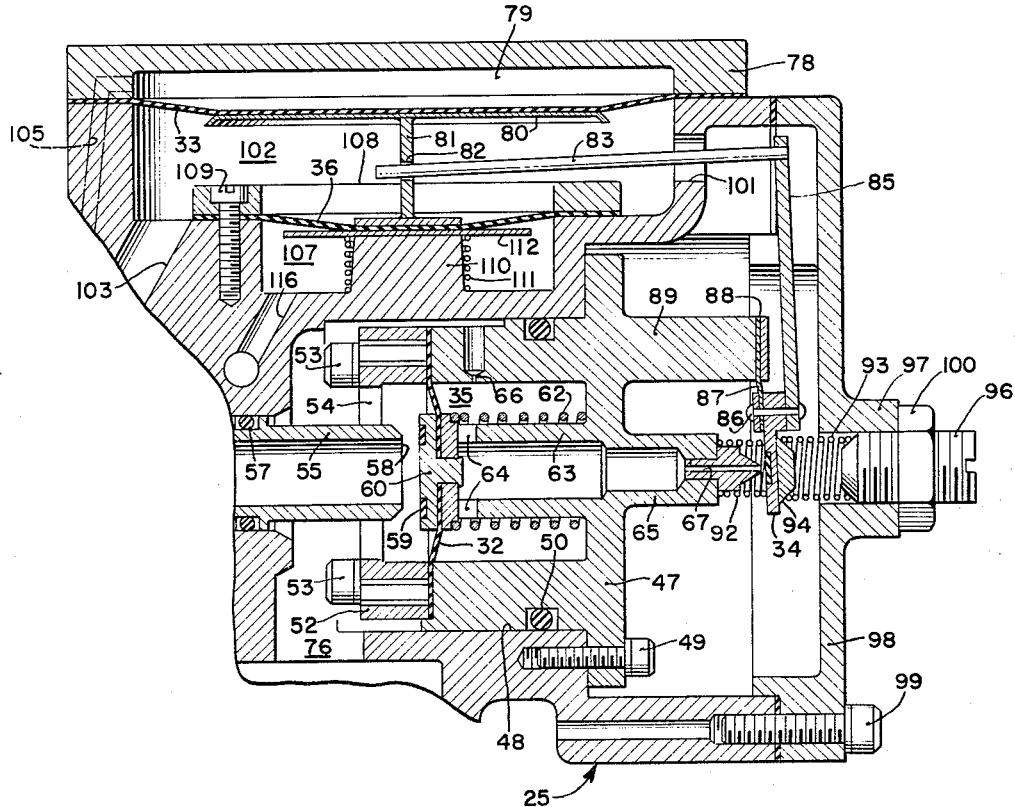
FIG. 4.
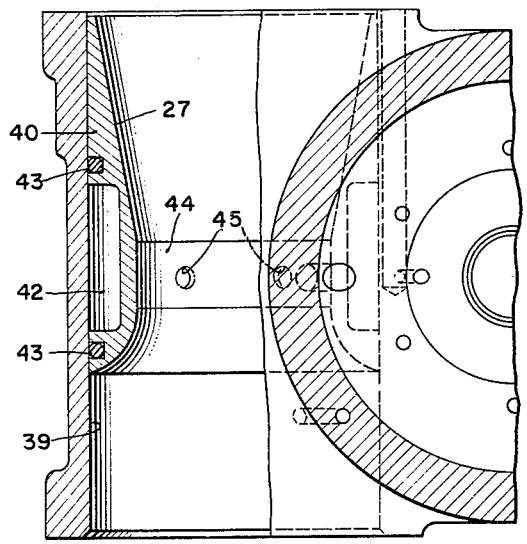
FIG. 5.
INVENTOR.
EUGENE G. SPENCER
ATTORNEY.

United States Patent Office 3,215,132
Patented Nov. 2, 1965

3,215,132
LIQUEFIED PETROLEUM FUEL SYSTEM FOR
INTERNAL COMBUSTION ENGINES
Eugene G. Spencer, Canoga Park, Calif.
(10521 Laramie Place, Chatsworth, Calif.)
Filed Mar. 28, 1960, Ser. No. 17,861
16 Claims. (Cl. 123—120)

The present application is a continuation-in-part of my co-pending application for United States Letters Patent Ser. No. 562,870, filed Feb. 1, 1956 for Liquefied Petroleum Fuel System for Internal Combustion Engines, now Patent No. 2,933,076.

This invention relates to internal combustion fuel systems and more particularly to an improved fuel system for converting liquefied petroleum fuel to gaseous form and supplying the same in a properly proportioned carbureted mixture to the intake manifold of an engine, the system featuring in particular a high sensitivity, high efficiency unitary assembly including a final stage pressure reducer, a carburetor and a positive safety fuel cut-off.

The present fuel system is generally similar to that disclosed in my co-pending application but differs in certain important respects to be pointed out in detail hereinbelow. It will be understood that the liquefied fuel storage facilities and auxiliaries including the first stage pressure regulator and its connection to a source of heat, such as the cooling system of the engine being supplied, may be and preferably are identical with those disclosed in the aforesaid earlier application. It will nevertheless be understood that other storage and supply auxiliaries as well as differently constructed first stage regulators may be employed to convert the liquefied petroleum to gas at a desired low pressure, if desired.

The specific improvements of the present invention pertain more particularly to the unitary carburetor-low-pressure-regulator-cut-off assembly, the components of which mutually cooperate to provide superior results over a wider range of operating conditions. Not only are all components of this unitary assembly more compact and simpler from a mechanical and structural standpoint, but the operation of this assembly is more positive, sensitive and reliable.

Among the serious disadvantages of prior liquefied petroleum fuel systems has been the adverse effect on the operation of the second stage regulator resulting from variations in the pressure of the gas discharging from the first stage regulator, it being found impractical in practice to maintain this outlet pressure consistently uniform owing to the wide range of temperatures over which the first stage regulator is required to operate. These fluctuating pressures in the gas supplied to the second stage regulator, though seemingly small in magnitude, are nevertheless relatively large in proportion to the very small pressure differentials employed to regulate the operation of the second stage pressure regulator.

Although the construction disclosed and claimed in the aforementioned co-pending application represented a very substantial improvement over prior design proposals in this art, it has been found less than completely satisfactory under certain infrequently encountered operating conditions. For example, the prior design has provision for a venting port from the second stage regulator which port is formed in the end of a tubular stem movable with the regulator diaphragm, the tubular member having a sliding low friction seal with the regulator housing. For highest efficiency operation and uniformity of sensitivity throughout its full operating range, it was found desirable to eliminate numerous factors and variables attending the use of this movable tube and venting port arrangement. Furthermore, it was found that highly superior and extremely sensitive results are obtainable by substantially eliminating all friction in the valve controlling flow through the venting port as well as by eliminating the effects of inertia by reducing the mass required to be moved in effecting adjustment of the regulator.

A further important improvement in the present design resides in the use of a positive fuel cut-off which is absolutely foolproof under all operating conditions and which is not subject to malfunctioning under certain engine operating conditions. For example, it sometimes happened that sudden full opening of the throttle valve to provide maximum fuel would operate the cut-off valve to interrupt all fuel flow. This undesirable occurrence resulted from the abrupt rise in the pressure in the manifold following full opening of the throttle, such rise permitting the safety fuel cut-off to come into operation unintentionally and at the very time when maximum fuel supply was desired. This possibility has been completely eliminated in the new design disclosed herein wherein the safety fuel cut-off opens and remains open so long as the intake manifold depression equals or exceeds 0.8 inch of water. The manifold pressure under any possible operating condition exceeds this value and, accordingly, it is impossible for the cut-off to close except and until the engine has come to substantially a complete stop, and this is true even in the fully open position of the throttle valve.

Accordingly, it is a primary object of the present invention to provide a liquefied petroleum fuel supply for internal combustion engines featuring maximum safety, simplicity of construction and functioning, compactness, ability to operate with full effectiveness and efficiency throughout all normally encountered operating conditons and wherein carburetion is effected only to a minor degree, if at all, by relatively wide range pressure filuctuation in the output of the first stage pressure regulator.

Another object of the invention is the provision of a liquefied petroleum fuel supply system of the type having a first stage pressure regulator located remotely from the engine being supplied and a combined carbureting and second stage pressure regulator constructed as a compact unitary assembly suitable for use in close proximity to the engine being supplied and capable of regulating the fuel supply with extreme uniformity despite variations in the pressure of the gaseous fuel entering the assembly and other variable factors encountered in the operation of such fuel systems.

Another object of the invention is the provision of a high sensitivity pressure regulator controlling the supply of gaseous petroleum fuel to an internal combustion engine characterized by its immunity to vibration and road shock operating conditions normally encountered in the use of motor propelled vehicles and making use of the pressure differential between axially spaced points of a carbureting venturi in cooperation with a low loss operating linkage to control the venting of gas from the closed chamber of the pressure regulator proper.

Another object of the invention is the provision of an improved unitary assembly incorporating carbureting, pressure regulating and fuel cut-off subassemblies and wherein fuel cut-off is effected by a spring biased diaphragm operable to override the high sensitivity diaphragm normally controlling operation of the pressure regulator, the overriding cut-off diaphragm being normally held retracted by the subatmospheric pressure prevailing in the intake manifold while the engine is rotating.

Another object of the invention is the provision of a carbureting and pressure regulating device for governing the supply of gaseous petroleum fuel to an internal combustion engine and wherein the venting of gas from a closed chamber of the pressure regulator is under the precision control of a regulating diaphragm operating through a substantially frictionless motion transmitting connection.

Another object of the invention is the provision of a combined carbureting and pressure-regulating assembly for use in supplying gaseous petroleum to an internal combustion engine wherein fuel wasting from the pressure regulator as an incident to the regulation of the regulator forms a part of the accurately controlled combustion mixture flowing to the engine under normal operating conditions and either part or all of the requisite fuel for engine idling requirements thereby avoiding the necesssity for separate idling fuel supply and control facilities.

These and other more specific objects will appear upon reading the following specifications and claims and upon considering in connection therewith the attached drawings to which they relate.

Referring now to the drawings in which a preferred embodiment of the invention is illustrated.

FIGURE 1 is a schematic representation of a fuel system incorporating the present invention, the second stage regulator and carbureting device being shown partly schematically and partly in section;

FIGURE 2 is a side elevational view of the combined carbureting and pressure-regulating device according to one preferred mode of manufacturing the same and differing from the FIGURE 1 schematic showing in that the axis of the venturi is rotated 90 degrees with respect to the other components;

FIGURE 4 is an enlarged fragmentary view similar to FIGURE 3 but showing the position of the parts in their fully open positions; and FIGURE 5 is a fragmentary cross-sectional view axially of the venturi tube and showing certain structural details thereof.

Figure 3:
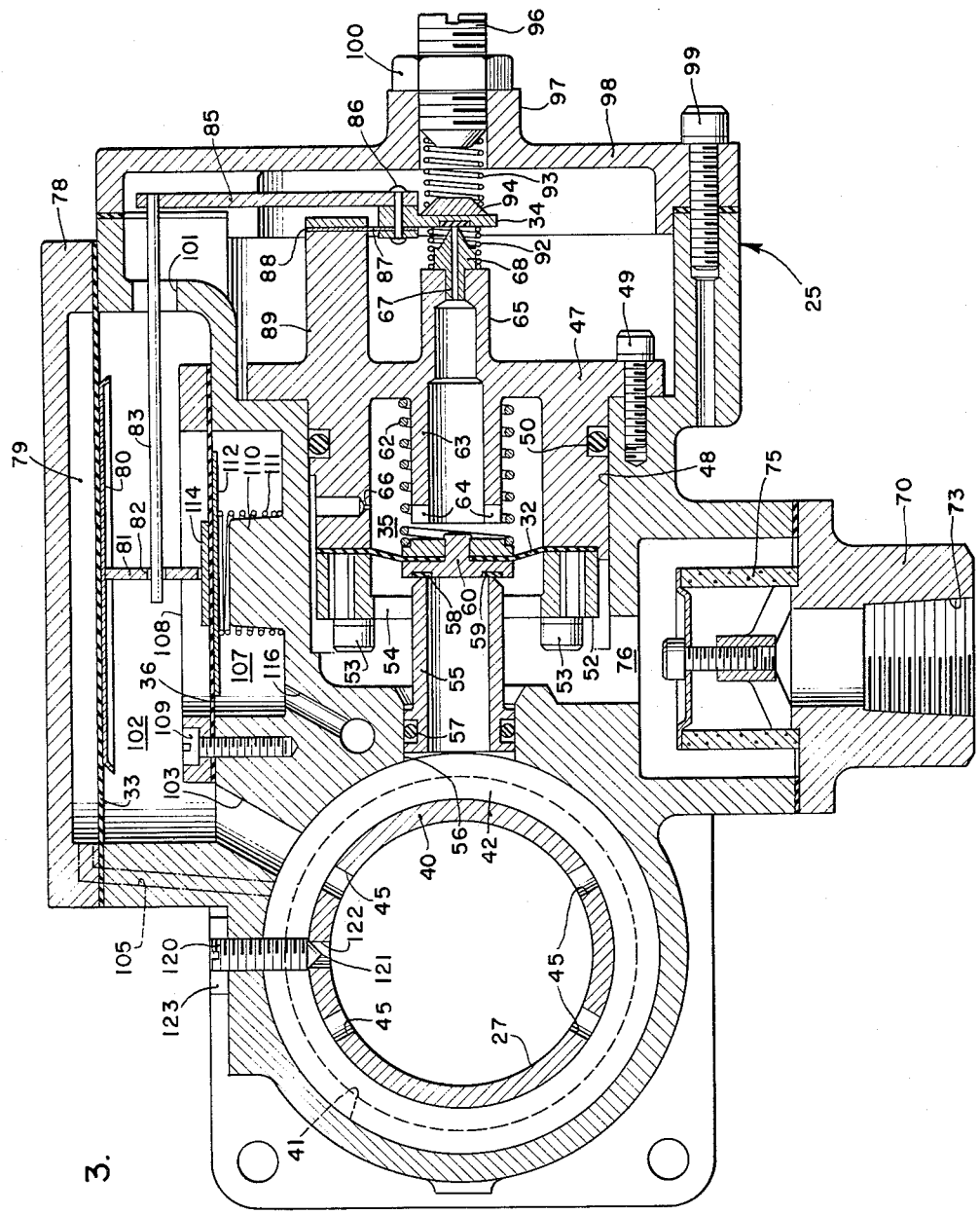
FIGURE 3 is an enlarged cross-sectional view taken along line 3—3 on FIGURE 2 showing the position of the parts with fuel flow fully cut off.

Referring more particularly to FIGURE 1, there is shown a liquefied petroleum fuel supply system designated generally 10. This system comprises a high pressure fuel tank 11 for having a valve 12 controlling fuel flow through conduit 13, filter 14, and solenoid valve 15 into a first stage pressure regulator 16 of any suitable construction operable to convert the high pressure liquefied butane or propane derived from storage tank 11 into gaseous fuel at a desired intermediate pressure and temperature for flow toward the engine through conduit 17. Preferably, first stage regulator 16 is of the type disclosed in the aforesaid patent 2,933,076, and includes both an automatic temperature regulator on the outlet side of the pressure regulator as well as a heat exchange unit, the latter being connected in circuit through conduits 18, 19 with a source of heat, such as the cooling circuit and radiator 20 of engine 21. The engine cooling circuit normally includes a pump 23 for circulating the cooling water through the engine block and radiator as well as through conduits 18 and 19 of a coil in heat exchange with fuel passing through regulator 16.

The combined carburetor, second stage pressure regulator and safety cut-off valve assembly, designated generally 25, is illustrated schematically in FIGURE 1 for convenience in conveying an understanding of the various passages. All such passages are shown as lying substantially in a common plane in FIGURE 1 but it will be understood this is not true of the structure shown in the remaining figures. It is to be noted further that the regulating and cut-off diaphragms shown at the top of the housing in FIGURE 1 are actually located in a vertical plane on the side of the housing and that fuel supply conduit 17 opens into the opposite side wall from the mentioned diaphragms.

Major components of regulator assembly 25 include a carbureting venturi passage or tube 27 opening at its lower end into a conduit 28 opening into engine intake manifold 31 and controlled by the usual butterfly throttle valve 29. The pressure of the gaseous fuel flowing to venturi 27 is governed by the low pressure gas regulator diaphragm 32 assisted by the high sensitivity control diaphragm 33 the function of which is to regulate valve 34 and thereby the venting of gas from the closed chamber 35 of the pressure regulator. The third major component of assembly 25 comprises a positive fuel cut-off device formed by a diaphragm 36 on side of which is in communication with fuel intake manifold 31 through conduits 37 and 116.

Extending vertically through the main body of the main housing for assembly 25 is a large diameter air intake passage 39 (FIGURE 5) snugly seating a somewhat shorter tubular shell 40 the interior of which is provided with a venturi-shaped passage 27. The upper inlet end 41 of passage 39 may communicate with the atmosphere through the usual air cleaner or be connected to the discharge of a supercharger. Surrounding the midportion of tubular shell 40 is a gas distributing annulus chamber 42 sealed to the inner side wall of passage 39, as by O-rings 43. Annulus 42 communicates with the venturi throat 44 through a plurality of radially directed ports 45.

The second stage pressure regulator has a generally cup-shaped main body fitting snugly within a well 48 of the main housing and is secured thereto as by cap screws 49. The side wall of housing 47 is appropriately sealed to the main housing as by an O-ring 50. The pressure regulator diaphragm 32 is secured across the rim of housing 47 by a clamping ring 52 and cap screws 53. Ring 52 is formed with radial spider arms 54 integral with a tubular gas conveying member 55 the outer end of which has a close sliding fit within passageway 56 of the main housing and is sealed thereto, as by an O-ring 57. The open-ended passageway through tube 55 opens into gas distributing annulus 42 encircling the venturi throat 44 and its opposite end forms a valve seat 58 against which the gasket 59 of a valve 60 rests under non-operating conditions. Valve 60 is secured to the center of pressure regulating diaphragm 32 and is normally urged into seating engagement against seat 58 of tube 55 by a coil spring 62 telescoped over a hollow boss 63 integral with the bottom of housing cup 47 and provided with one or more gas flow notches 64 in the rim end thereof. Boss 63 is located centrally of the closed chamber 35 of the pressure regulator.

Chamber 35 is in communication with the opposite or high pressure side of regulating diaphragm 32 through a metering orifice 66 extending through the side wall of housing 47, the size of this orifice being accurately determined and being appreciably less than the cross-sectional area of venting port 67 formed axially through a combined plug and valve seat 68 mounted in the outer end of tubular boss 65. The area ratios of ports 66 and 67 vary over a considerable range depending on the size of the engine being supplied, the strength of spring 62, the area of diaphragm 32 and the like variables. Usually the area of port 67 is approximately double that of orifice 66 and such that when port 67 is fully open, regulator valve 60 is also fully open. At this point it is to be noted that the fuel gas at the intermediate pressure supplied by the first stage regulator 16 is conveyed by conduit 17 into housing assembly 25 through a fitting 70 provided with threads 73, the latter being secured to the side of the main housing by cap screws 71 (FIGURE 2). This gas passes through a suitable filter 75 and into a plenum chamber 76 surrounding tube 55, chamber 76 being formed in part by the pressure regulating diaphragm 32 in the manner made clear by FIGURE 3. It will be understood that chamber 76 is in communication with the outer end of metering orifice 66 supplying fuel to the closed chamber 35 of the regulator.

The high sensitivity means for controlling the venting of gas from closed chamber 35 of the regulator comprises a very thin flexible membrane or diaphragm 33, regulating valve 34, and a substantially frictionless operating linkage interconnecting these components. The rim of the very thin impervious membrane 33 is held tightly sealed to one side wall of the main housing, as by a cover plate 78 and suitable assembly screws, not shown. The interior of cover 78 is spaced from the adjacent surface of the diaphragm to provide a small volume chamber 79. Cemented or otherwise secured to the center of the opposite surface of diaphragm 33 is a disc 80 of thin lightweight rigid material having a strut 81 projecting axially from its center and provided with a transverse opening 82 slidably seating therein a rigid rod 83 forming part of the linkage connecting the diaphragm to valve 34. The right hand end of rigid rod 83 as viewed in FIGURE 3 is firmly seated in a rigid strip 85 rigidly secured by rivet 86 to valve member 34 and to the free end of a highly flexible supporting strip 87. Strip 87 is formed of suitable highly flexible strip material such as phosphor bronze capable of being flexed countless times without substantial change in its physical properties or approaching its fatigue point. One end 88 of strip 87 is rigidly secured to a stationary part of the housing, as boss 89 integral with regulator housing 47, the opposite end being rigidly secured to valve 34 and operating linkage 83, 85 by rivet 86.

Owing to the flexibility of strip 87 it will be apparent that valve 34 can be shifted toward and away from the end of venting port 67 by the application of the slightest movement to the free end of linkage rod 83 by control diaphragm 33. However, due to the wide width of strip 87, valve 34 is constrained against movement in any direction except toward and away from venting port 67. The described operating linkage is therefore seen to lack pivotal supports, bearings or other typical supporting means involving the employment of relatively moving parts subject to friction losses and offering resistance to the movement of the valve operating linkage; and yet the parts are constrained to move only within a plane prescribed and controlled by supporting strip 87.

Surrounding venting port 67 and tip 68 is a lightweight spring 92 having its free end bearing against valve 34 and urging it away from seating engagement with port 67. Opposing spring 92 is a second lightweight spring 93 having one end seated over a boss 94 of valve 34 and its other end bearing against the conical end of adjustable set screw 96. This set screw is threadedly supported in a boss 97 formed axially of a cover plate 98 secured to one end of the main housing by cap screws 99. Set screw 96 is clamped in a desired adjusted position by a lock nut 100, it being pointed out that set screw 96 is first adjusted to position valve 34 properly to pass the requisite amount of fuel to support engine idling fuel requirements. All fuel escaping through the venting port passes through port 101 and into a chamber 102 formed between regulating diaphragm 33 and cut-off diaphragm 36. The fuel then passes from chamber 102 through a passage 103 into gas distributing annulus 42 surrounding the throat of venturi passage 27.

There remains to be described minor details of the cut-off device and the manner of communicating the pressure of the inlet air to chamber 79 on the outer side of control diaphragm 33. As is best shown in FIGURE 1, chamber 79 is in communication with inlet end 41 of the venturi passage through a passage 105 formed in the main housing of assembly 25. This same passage 105 is shown by dot-and-dash line in FIGURE 3. If the inlet of the venturi communicates substantially directly with the atmosphere then it will be apparent that the pressure within chamber 79 is likewise substantially atmospheric or slightly therebelow owing to slight losses. However, if a supercharger is being employed to supply combustion air to the carburetor then the pressure within chamber 79 will be appreciably above atmospheric and determined by the discharge pressure at the supercharger.

The safety fuel cut-off device comprises a flexible diaphragm 36 held to the rim of a cup-shaped chamber 107 formed interiorly of the of the main housing by a ring 108 and cap screws 109. The bottom of chamber 107 is formed with a boss 110 over which a light compression spring 111 seats with its outer free end bearing against a disc 112 cemented or otherwise secured to the inner side of diaphragm 36. A similar but small disc 114 is secured to the outer central portion of the diaphragm and provides an abutment for the end of strut 81. Of importance is the fact that strut 81 has no connection with disc 114 but is free to move toward and away from this disc depending upon the particular operating conditions prevailing within the device at any given time. Strut 81 is shown supported by cut-off diaphragm 36 in FIGURE 3 because under the conditions there shown, engine 21 is not operating and atmospheric pressure is communicated to chamber 107 by way of passage 116 and conduit 37 (FIGURE 1), it being noted that the end of passage 116 is connected to conduit 37 which opens into intake manifold 31. Accordingly, whenever the engine is not operating atmospheric pressure is communicated to the intake manifold through the carbureting device conduit 28. Likewise atmospheric pressure conditions will exist in chamber 102 (FIGURE 3) on the opposite side of cut-off diaphragm 36 with the result that spring 111 is effective to urge diaphragm 36 outwardly against strut 81. This movement acts through linkage members 83, 85 to close valve 34 against venting port 67 thereby cutting off all fuel supply to the engine in a manner which will be explained presently.

The described carbureting device includes a further adjustment useful in accommodating the regulator to the requirements of differing fuels and providing a fine vernier type adjustment of the overall assembly. This adjustment will be best understood by referring to the upper left hand corner of FIGURE 3 wherein it will be noted that a set screw 120 is mounted in the side of the main housing at a point opposite throat 44 (FIG. 5) of venturi tube 27. The inner pointed end 121 of this set screw is adjustable relative to the outer end of a radial port 122 corresponding to one of ports 45 supplying gas to the venturi throat. For certain fuels the pointed end 121 of set screw 120 may be fully seated against port 122 and held locked there as by lock nut 123. However, when using other fuels, it may be desirable to admit an additional quantity of fuel. In this event set screw 120 is turned outwardly to requisite degree found to provide optimum operating results, a condition easily observed as adjustments of screw 120 are made while the engine is running.

It remains to point out certain rather obvious structural advantages and features of the described unitary assembly. For example, access may be had to the second stage pressure regulator assembly simply by removing cap screws 99 and cover plate 98. Should one wish to remove the regulator assembly per se, it is merely necessary to remove cap screws 49 and withdraw the unitary regulator from bore 48 of the main housing along with all components of the valve operating linkage. In this connection it will be noted that the inner free end of rod 83 extends freely through opening 82 of strut 81. Reassembly of the components is accomplished equally as expeditiously. Servicing access to the control and cut-off diaphragms is had by removing cover plate 78. Likewise, cleaning of secondary filter 75 is accomplished merely by removing fitting 70 and unscrewing the cap screw holding filter cartridge 75 assembled against the inner end of fitting 70.

The operation of the described fuel system will be readily appreciated by those skilled in this art and particularly those having a familiarity with the operation of the system disclosed in my patent the application for which is now pending. Liquefied petroleum contained within storage tank 11 at pressures ranging from 20 to 250 p.s.i. passes through the usual auxiliary into the first stage pressure regulator 16 where it is converted to gas at a much lower pressure, this pressure being automatically regulated and controlled both by the mutually cooperating action of the pressure regulator, the automatic thermostat control and the heat exchanger units forming the essential components of assembly 16 and functioning in the manner described in the aforementioned patent to supply gaseous fuel at a predetermined positive pressure and temperature to the combined second stage regulator and carburetor.

The gaseous fuel issuing from the first stage regulator 16 passes through conduit 17, fitting 70, secondary filter 75 into the main inlet chamber 76 of the second stage regulator and carbureting device 25. A portion of this fuel gas passes through metering port 66 into closed chamber 35 of the low pressure regulator. If the engine is not operating the parts are in the position shown in FIGURE 3 and cut-off diaphragm 36 and its back-up spring 111 are effective through linkage members 83, 85 to hold valve 34 closed against venting port 67. Under these conditions no gas can escape from chamber 35 and the pressure within this chamber equals that of the gas in chamber 76, i.e., on the outer side of regulator diaphragm 32. In consequence, spring 62 acts against diaphragm 32 to hold valve 60 against valve seat 58 on the adjacent end of tube 55 with the result that none of the high pressure gas in chamber 76 can enter the gas distributing annulus 42 surrounding the throat of the carbureting venturi. Neither can gas escape from chamber 35 through venting port 67 and enter the distributing annulus 42 by way of chamber 102 and passage 103. Accordingly, it is impossible for any gas to enter the engine or to escape to the atmosphere by way of the carburetor intake 41.

Let it now be assumed that the operator wishes to start engine 21. All that is necessary to open the fuel control valves is to rotate the engine main crank shaft by the starter motor or by the usual engine starting crank. Reciprocation of the pistons within the engine will pull a partial vacuum within intake manifold 31 and this pressure reduction will be communicated through conduit 37 and passage 116 to chamber 107 of the fuel cut-off unit, a reduction or depression of the manifold pressure of as little as 0.8 inch of water being adequate to flex cut-off diaphragm 36 inwardly compressing spring 111. This action removes the effect of spring 111 on linkage members 83, 85 thereby allowing the pressure of the gas within chamber 35 of the pressure regulator, in cooperation with the action of springs 92, 93, to move valve 34 away from venting port 67. Gas then escapes through port 67 and flows through port 101, chamber 102 and passage 103 into annulus 42 of the carburetor from which it escapes into venturi passage 27. Initially valve 34 opens rather widely allowing the pressure in regulator chamber 35 to decay quickly and effect fast and wide opening of the main fuel valve 60 thereby providing a rich starting fuel mixture. As the gas pressure in chamber 102 rises it acts to flex diaphragm 33 outwardly thereby throttling the flow from port 67 and increasing the pressure in chamber 35 to throttle pressure regulator valve 60 by a definite increment and provide a leaner fuel mixture desired soon after the engine starts.

At this time the engine will be in normal operation and the regulation of engine throttle valve 29 by the accelerator (not shown) or other control to change the volume of air entering venturi inlet 41 will be effective to produce a directly related change in the amount of fuel entering through fuel feeding orifices 45 located in venturi throat 44. For example, if throttle 29 is opened to increase the air flow there will result a corresponding reduction in pressure in throat 44 thereby permitting a larger volume of gas to enter from fuel supply annulus 42. Concurrently, there will be a lowering of the fuel pressure in chamber 102 causing valve 34 to open further, it being understood that movements of diaphragm 33 are communicated to valve 34 through strut 81 and the frictionless linkage members 83, 85. In consequence, the lower pressure in regulator chamber 35 allows valve 60 to open to pass the required additional fuel and to establish a fuel pressure in annulus 42 so related to the inlet air pressure as to maintain the desired predetermined fuel and air ratio, a condition automatically maintained at all engine operating speeds.

From the foregoing it will be understood that the highly sensitive large area sensing and control diaphragm 33 has its associated chambers 79 and 102 mounted in immediate proximity to the venturi with chamber 79 in communication with venturi inlet 41 through passage 105 and with chamber 102 in communication with fuel annulus 42 through passage 103. Diaphragm 33 is therefore instantly sensitive and responsive to the slightest change in the pressures within chambers 79 and 102 as well as in the portions of the carburetor venturi communicating therewith to regulate the frictionless valve 34 controlling the operation of pressure regulator diaphragm 32. In this manner, valve 34 is moved toward or away from the end of port 67 to vary by fine increments the amount of gas allowed to escape from regulator chamber 35. It will therefore be appreciated that diaphragm 32 is instantly responsive to everchanging operating conditions to meter fuel past valve 60 and into tube 55 and, in so doing, further reducing the pressure of the fuel supply and regulating the amount thereof entering distributing annulus 42. It is pointed out and emphasized that the regulator operates to maintain the fuel pressure in annulus 42 substantially identical with that of the intake air at venturi entrance 41. In consequence, the fuel-air ratio remains constant over a wide range of engine operating conditions.

An important feature of the invention is the fact that changing pressure conditions of the fuel entering regulating chamber 76 does not adversely affect the operation of the pressure regulator for the reason that such changing fuel pressures are communicated through metering orifices 66 to the closed regulator chamber 35. Accordingly, the differential across the diaphragm remains substantially the same despite relatively wide range variations in the pressure of the fuel entering chamber 76.

As the operator removes his foot from the accelerator, throttle valve 29 substantially closes and passes only the small amount of air required for engine idling. At such times the manifold pressure will be unusually low owing to the nearly closed position of throttle 29. Under these low pressure conditions, cut-off diaphragm 36 remains fully retracted. The engine then operates at idling speed on fuel supplied in part or entirely from venting port 67, it being understood that the adjustment on the opposed springs 92, 93 is such as to permit valve 34 to remain in open position. It is also pointed out that during engine idling, regulator valve 60 may also be slightly open and functioning to provide a portion of the idling fuel requirements. This mode of operation is particularly desirable in larger engines. However, in general it can be stated that the supply of idling fuel under the control only of valve 34 or this valve acting cooperatively with regulator valve 60 is optional in many instances and a matter of designer's choice. Usually in practice the use of both valves is found advantageous. Should the idling speed be too low the operator merely loosens lock nut 100 and turns set screw 96 outwardly slightly to decrease the effectiveness of spring 93 on valve 34. Under these circumstances a slightly increased flow of idling fuel takes place. On the other hand, if idling speed is too high the operator adjusts set screw 96 inwardly slightly increasing the pressure on spring 93 and closing valve 34 by a slight amount. Once screw 96 is adjusted, lock nut 100 is again tightened.

The engine may stall while idling or if an excessive load be imposed thereon while the engine is operating too slowly. Whether stalling occurs while valve 60 is open or closed is of no consequence to the effective and positive cut-off of all fuel flow. Irrespective of the cause of stalling, the pressure within the intake manifold of the stalled engine will quickly rise to atmospheric and will be communicated to the opposite sides of cut-off diaphragm 36. As a result, spring 111 will shift diaphragm 36 outwardly toward strut 81 and operate linkage members 83, 85 to close valve 34 against venting port 67. The resulting increase in gas pressure within chamber 35 will act in concert with spring 62 to hold valve 60 positively seated until the engine is again turned over to reduce the pressure in chamber 107 and permit the opening of venting valve 34. Accordingly, it will understood that it is impossible under any operating conditions for the present system to fail to cut off all fuel flow when the engine is not rotating.

While the particular liquefied petroleum fuel system for internal combustion engines herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In combination with the intake manifold of an internal combustion engine, a carbureting device for air and gaseous fuel having a mixing chamber formed by a venturi tube, means for supplying air to the inlet end of said tube, including a fuel manifold at the venturi throat means for conducting the resulting mixture of fuel and air to said manifold, a pressure regulator including throttling valve means controlling the supply of fuel to said venturi throat and including a control chamber in communication with the fuel supply through a metering orifice, said pressure regulator having stationary venting port means opening from said control chamber, and control means for regulating the escape of gaseous fuel from said venting port means of said pressure regulator including a high sensitivity control diaphragm having one side subject to the air inlet pressure of said venturi and the other side subject to the pressure in said fuel manifold.

2. The combination defined in claim 1 characterized in that said control means for regulating the escape of fuel from said venting port acting in concert with said throttling valve means mutually cooperate to maintain the fuel and air ratio substantially constant throughout the operating speed range of the engine supplied by said carbureting device.

3. The combination defined in claim 1 characterized in the provision of means for adjusting said carbureting device to vary the fuel supplied to meet engine idling requirements, said means including spring means bearing against said means for regulating the escape of gaseous fuel from said venting port means and adjustable means for varying the effectiveness of said spring means.

4. The combination defined in claim 1 characterized in that said means for regulating the escape of fuel from said venting port means comprises a valve member supported from a thin resilient strip permitting said valve member to move toward and away from said venting port with neglible loss while restraining movement of said valve member in all other directions.

5. The combination defined in claim 4 characterized in the provision of light spring means opposed to one another from the opposite sides of said valve member, and means for adjusting the relative effectiveness of said springs on said valve member.

6. The combination defined in claim 3 characterized in the provision of fluid passage means for conducting gaseous fuel escaping from said venting port means into the throat of said venturi tube, and additionally characterized in that a pressure differential across said high sensitivity control diaphragm indicative of engine idling operation is effective to hold said valve member in position to supply sufficient fuel therepast substantially to satisfy engine idling requirements.

7. The combination defined in claim 4 characterized in the provision of fluid passage means for conducting gaseous fuel escaping from said venting port means into said venturi to provide a portion of the accurately proportioned fuel and air mixture formed within said venturi tube for both engine idling and normal power operating requirements.

8. The combination defined in claim 4 characterized in the provision of fluid passage means for conducting gaseous fuel escaping from said venting port means and combining the same with fuel flowing into the throat of said venturi tube from the discharge side of said throttling valve means to provide the necessary fuel to meet engine idling requirements.

9. The combination defined in claim 3 characterized in the provision of diaphragm means having one side thereof in communication with the interior of the engine intake manifold and responsive to the internal pressure thereof to override said high sensitivity control diaphragm and to hold said valve member closed across said venting port.

10. In combination with the intake manifold of an internal combustion engine, a carbureting device for air and gaseous fuel having a mixing chamber formed by a venturi tube, means for supplying air to the inlet end of said tube, said venturi tube having a housing secured thereto, pressure regulating means supported by said housing provided with pressure-responsive diaphragm-supported throttling valve means for supplying a main stream of pressurized gaseous fuel to the throat of said venturi tube and including control means cooperating with said throttling valve means operable to prevent fuel flow to said venturi when atmospheric pressure conditions prevail in said intake manifold, said pressure regulator having a chamber closed at one end by said pressure-responsive diaphragm and provided with a metering orifice for supplying pressurized gaseous fuel thereinto, a stationary valved orifice opening from said pressure regulator chamber into passage means communicating with the throat of said venturi tube, a pair of mutually cooperating diaphragms including means operatively connecting the same to said valved orifice to control flow therethrough, means subjecting one of said cooperating diaphragms to the pressure differential existing at longitudinally spaced points along said venturi tube to regulate flow through said valved orifice, and means subjecting one side of the other of said cooperating diaphragms to pressure conditions in said intake manifold and effective to hold said last-mentioned diaphragm out of controlling position with respect to said valved orifice so long as subatmospheric conditions prevail in said intake manifold and leaving said one diaphragm free to regulate said valved orifice.

11. In combination with the intake manifold of an internal combustion engine, a carbureting device for air and gaseous fuel having a mixing chamber formed by a venturi tube, means for supplying air to the inlet end of said tube, said venturi tube having a pressure regulating and flow control housing operatively associated therewith, a pressure regulating diaphragm cooperable with the end of a fuel delivery passage to admit fuel at a predetermined pressure thereinto for delivery into the throat of said venturi, said regulating diaphragm forming a substantially closed chamber with said housing, a metering orifice for conveying pressurized fuel into said closed chamber, stationary valved venting port means opening from said chamber into a second chamber of said housing, a first and a second control diaphragm means supported in said housing including operating connection means extending therefrom to said valved venting port means, means for passing fuel escaping from said valved venting port means past one side of each of said control diaphragms and into the fuel flowing into said venturi throat, means placing the other side of said first diaphragm means in communication with the air inlet end of said venturi tube, means placing the other side of said second diaphragm means in communication with said intake manifold and effective to hold said second diaphragm means retracted and out of position to control said valved venting port means, said second diaphragm means being effective to override said first diaphragm means and to hold said valved venting port closed when said intake manifold is at atmospheric pressure, and the high pressure fuel trapped in the closed chamber of said pressure regulator then being effective on said pressure regulating diaphragm to close off fuel flow to said venturi tube so long as said intake manifold remains at atmospheric pressure.

12. A combined gaseous fuel regulator and safety cut-off valve assembly enclosed within a common housing having as fuel supply and adapted to be connected to an engine intake manifold, a first flexible diaphragm means mounted in said housing and movable relative to an outlet leading to a gas and air mixing chamber to supply fuel thereto at a controlled pressure, second and third flexible diaphragm means mounted in said housing with one face of each exposed to a common chamber, linkage means in said common chamber operatively connected to both of said second and third diaphragm means and controlling the venting of fuel from one side of said first diaphragm through a venting port thereby to regulate the pressure of the main fuel stream flowing to said mixing chamber, means for subjecting said second diaphragm means to a pressure differential representative of the engine fuel demand at different operating rates thereby to vary the venting of fuel from said one side of said first diaphragm means only so long as said third diaphragm means is held retracted, and pressure responsive means operatively connecting said engine intake manifold and said third diaphragm means, said third diaphragm means being responsive to intake manifold pressure and being held in retracted position thereby while the engine is in motion.

13. A combined fuel regulator and safety cut-off valve as defined in claim 12 characterized in that said linkage means is connected directly to said second diaphragm means and is movable therewith and includes a portion located in the path of movement of said third diaphragm means when the latter withdraws from the retracted position thereof whereupon said third diaphragm means is effective to override said second diaphragm means and to positively close said venting port causing the pressurized fuel to act on said first diaphragm means and close said fuel outlet and hold the same closed until said venting port is reopened.

14. A combined fuel regulator and safety cut-off valve as defined in claim 12 characterized in that said linkage means is pivotless and supported primarily cantilever fashion from one end of a thin wide highly flexible strip anchored to said housing and supporting one portion of said linkage means for limited to-and-fro movement toward and away from said venting port.

15. A gaseous fuel regulator and safety cut-off assembly as defined in claim 12 characterized in the provision of gaseous fuel filter means connected in series with the fuel supply to said assembly.

16. The combination defined in claim 9 characterized in that each of the recited components is located in a common unitary housing.

References Cited by the Examiner
UNITED STATES PATENTS

| | | | |
|---|---|---|---|
| 2,258,003 | 10/41 | Dickson | 48—180 |
| 2,775,981 | 1/57 | Zonker | 48—180 |
| 2,777,432 | 1/57 | Ensign | 123—120 |
| 2,933,076 | 4/60 | Spencer | 123—120 |

MORRIS O. WOLK, *Primary Examiner.*

GEORGE D. MITCHELL, MAURICE A. BRINDISI,
*Examiners.*

UNITED STATES PATENT OFFICE
CERTIFICATE OF CORRECTION

Patent No. 3,215,132 November 2, 1965

Eugene G. Spencer

It is hereby certified that error appears in the above numbered patent requiring correction and that the said Letters Patent should read as corrected below.

Column 9, line 37, for "including a fuel manifold at the venturi throat means for" read -- means including a fuel mainfold at the venturi throat for conducting fuel into the throat of said venturi tube, means for --.

Signed and sealed this 16th day of August 1966.

(SEAL)
Attest:

ERNEST W. SWIDER
Attesting Officer

EDWARD J. BRENNER
Commissioner of Patents